United States Patent
Flannery et al.

(10) Patent No.: US 9,781,268 B2
(45) Date of Patent: Oct. 3, 2017

(54) SYSTEM AND METHOD FOR CONTACT CENTER ROUTING OF A CUSTOMER BASED ON MEDIA CAPABILITIES

(71) Applicant: Avaya Inc., Santa Clara, CA (US)

(72) Inventors: Peter Flannery, Galway (IE); Paul D'Arcy, Galway (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/291,028

(22) Filed: May 30, 2014

(65) Prior Publication Data

US 2015/0350445 A1    Dec. 3, 2015

(51) Int. Cl.
 *H04M 3/00* (2006.01)
 *H04M 5/00* (2006.01)
 *H04M 3/523* (2006.01)

(52) U.S. Cl.
 CPC ................ *H04M 3/5232* (2013.01)

(58) Field of Classification Search
 USPC .............. 379/265.11; 705/304; 706/12
 See application file for complete search history.

(56) References Cited

U.S. PATENT DOCUMENTS

| | | | |
|---|---|---|---|
| 6,389,400 B1* | 5/2002 | Bushey | G06Q 10/06311 705/7.14 |
| 6,704,409 B1* | 3/2004 | Dilip et al. | 379/265.02 |
| 7,308,093 B2 | 12/2007 | Annadata et al. | |
| 2005/0135595 A1* | 6/2005 | Bushey et al. | 379/265.01 |
| 2007/0223523 A1* | 9/2007 | Montpetit | H04L 41/12 370/465 |
| 2008/0056233 A1* | 3/2008 | Ijidakinro | H04L 29/06027 370/352 |
| 2010/0205017 A1* | 8/2010 | Sichelman | G06Q 10/02 705/5 |
| 2010/0241577 A1* | 9/2010 | Geppert et al. | 705/304 |
| 2014/0254790 A1* | 9/2014 | Shaffer | H04M 3/5233 379/265.11 |
| 2014/0274171 A1* | 9/2014 | Cooper et al. | 455/466 |

* cited by examiner

*Primary Examiner* — Quynh Nguyen
(74) *Attorney, Agent, or Firm* — Stevens & Showalter, LLP (57) ABSTRACT

A system for selecting an agent during initial routing based on all the media capabilities associated with a customer and their current device. The system includes a data mining module to mine one or more media capabilities on a device of a customer. The system further includes a customer profile module to build a customer profile based on the one or more mined media capabilities on the device. The system further includes a mapping module to map the customer profile with an agent profile. The system further includes a selection module to select an agent for the customer based on the mapping.

20 Claims, 5 Drawing Sheets

SYSTEM AND METHOD FOR CONTACT CENTER ROUTING OF A CUSTOMER BASED ON MEDIA CAPABILITIES

BACKGROUND

Field of the Invention

Embodiments of the present invention generally relate to contact centers and in particular to a system and method for selecting an agent during initial routing based on media capabilities associated with a customer.

Description of Related Art

Contact centers are employed by many enterprises to service inbound and outbound contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts or customers. Contact centers distribute contacts, whether inbound or outbound, for servicing to any suitable resource according to predefined criteria. In many existing systems, the criteria for servicing the customer from the moment that the contact center becomes aware of the customer until the customer is connected to an agent are client or operator-specifiable (i.e., programmable by the operator of the contact center), via a capability called vectoring. Normally in present-day ACDs when the ACD system's controller detects that an agent has become available to handle a contact from a customer, the controller identifies all predefined contact-handling queues for the agent (usually in some order of priority) and delivers to the agent the highest-priority, oldest customer that matches the agent's highest-priority queue. In contact centers, quickly finding and assigning a well-qualified agent to service and fulfill a customer's need is important in providing improved customer satisfaction.

Traditional contact center technology matches incoming contacts to agents based on a combination of the customer's identity, the topic that relates to the request (such as attributes of the request), the media channel that the customer is currently using for the request (Voice call, Email, Instant message etc.), the priority of the request, the length of time, agent availability, agent skill sets, agent's media channels, and other factors during the call routing process.

Specifically, traditional contact routing relies on routing customers based on matching an agent with the media capability that the customer initiates at the time of communication with a contact center. Communication between the customer and the agent at the contact center may be accomplished by one or more media capabilities. A media capability is a form of media communication and includes a communication channel. Media capabilities may include, but are not limited to, a web capability, a text capability, a voice capability, a video capability and/or a video with voice capability. Further, the customer may also communicate with the agent at the contact center through social media networks. The media capabilities may vary in characteristics like bandwidth requirement, the latency of support (i.e., how close to real-time, immediacy, responsiveness, etc.), the level of participation by the agent, usage of other system resources, and so forth. For example, an email capability uses relatively little bandwidth and there may be a moderately high tolerance for latency. In contrast, a voice capability using phone communication uses relatively more bandwidth and a video capability requires even more bandwidth.

Currently, when a customer communicates with a contact center for a work request, the media capability is matched when finding an agent. For example, if a customer initiates communication with a contact center using a media capability such as web chat, then an agent is matched to the customer who can respond via that media capability, i.e., web chat. However, if a customer begins with one media capability and wants to switch to a second media capability during their interaction with the agent, there is no guarantee the agent can support the second media capability. If the agent cannot support the second media capability, then the customer will need to be routed to a different agent.

For example, the customer may initially be speaking with an agent using a voice capability and may want to switch to a video capability. However, the selected agent may not support a video capability as the agent's device may not have that facility or may not be allocated the required amount of bandwidth for video communication. As a result, in order to comply with the customer's request, the contact center will have to reroute the customer to a new agent who's device supports has a video capability. Rerouting is inefficient as the customer must begin again with a new agent on the same issue (i.e., same work request). This rerouting of the customer is expensive in terms of time resolution, discontinuity for the customer, and general contact center efficiency since two or more agents will have worked on the same issue. Furthermore, as multimedia devices such as smart phones become more prevalent and the range of media channels easily accessible to customers increase, the customer switching between media capabilities is going to become a more frequent problem.

There is thus a need for an improved initial routing of a customer to an agent for a work request to include predicted future escalation and/or de-escalation of a media capabilities associated with the customer.

SUMMARY

Embodiments in accordance with the present invention provide a system for routing customers to agents in a contact center. The system includes a data mining module to mine one or more media capabilities on a device of a customer. The system further includes a customer profile module to build a customer profile based on the one or more mined media capabilities on the device. The system further includes a mapping module to map the customer profile with an agent profile. The system further includes a selection module to select an agent for the customer based on the mapping.

Embodiments in accordance with the present invention further provide a computer-implemented method for routing a customer in a contact center based on media capabilities. The computer-implemented method includes extracting one or more media capabilities from a device of a customer, building a customer profile based on the one or more extracted media capabilities and one or more prior media capabilities previously used by the customer, mapping the customer profile with an agent profile and selecting an agent for the customer based on the mapping between the customer profile and the agent profile.

Embodiments in accordance with the present invention further provide a computer readable medium storing computer readable instructions when executed by a processor performs a method. The method includes mining one or more media capabilities from a device of the customer, building a customer profile based on the one or more mined media capabilities, mapping the customer profile with an agent profile; and selecting an agent for the customer based on the mapping between the customer profile and the agent profile.

Embodiments of the present invention can provide a number of advantages depending on the particular configuration. First, embodiments of the present invention provide matching of media capabilities associated with a customer and media capabilities of an agent at the contact routing process. In embodiments of the present invention, the media capabilities of the customer device and the prior history of the customer are used to predict media capabilities of the customer that should be initially used in order to match the customer with an agent. The matching of the customer's associated media capabilities is based on the prior history of contact between the customer and the contact center as well as extracting media capabilities from the customer's media device, and requires no extra effort on the part of the customer or the agent of the contact center.

These and other advantages will be apparent from the disclosure of the invention(s) contained herein.

The preceding is a simplified summary of the present invention intended to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word may is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relates to a system and method for routing a customer to an agent using a contact center based on possible future media capabilities and channels. More specifically, embodiments of the present invention relate to a system and method for initially determining which media capabilities are possible or likely to be used by the customer and their associated customer device while communicating with an agent.

Embodiments in accordance with the present invention provide solutions based on a standard protocol (E.g., SIP, H.323, etc.) for providing instant messaging to voice and/or video call escalation, with consistent reporting, leveraging existing call manager (CM) functionality (e.g., support of phantom calls, delivery of User to User Information (UUI) to H.323 agent phones, providing pop-up of an agent browser, etc.), which minimizes risks and/or changes. Embodiments in accordance with the present invention furthermore provide improved flexibility by use of a plug-N-play architecture. Embodiments in accordance with the present invention further optimize the usage of Automatic Call Distribution (ACD) media resources which servicing chat and call sessions.

Embodiments of the present invention will be illustrated below in conjunction with an exemplary communication system. Although well suited for use with, e.g., a system having an ACD or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH- EPROM, a solid state medium like a memory card, any other memory chip or cartridge, a carrier wave as described hereinafter, or any other medium from which a computer can read.

A digital file attachment to email or other self-contained information archive or set of archives is considered a distribution medium equivalent to a tangible storage medium. When the computer-readable media is configured as a database, it is to be understood the database may be any type of database, such as relational, hierarchical, object-oriented, and/or the like. Accordingly, embodiments of the present invention include a tangible storage medium or distribution medium and prior art-recognized equivalents and successor media, in which the software implementations of embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while embodiments of the present invention are described in terms of exemplary embodiments, it should be appreciated those individual aspects of the present invention can be separately claimed.

Figure 1:
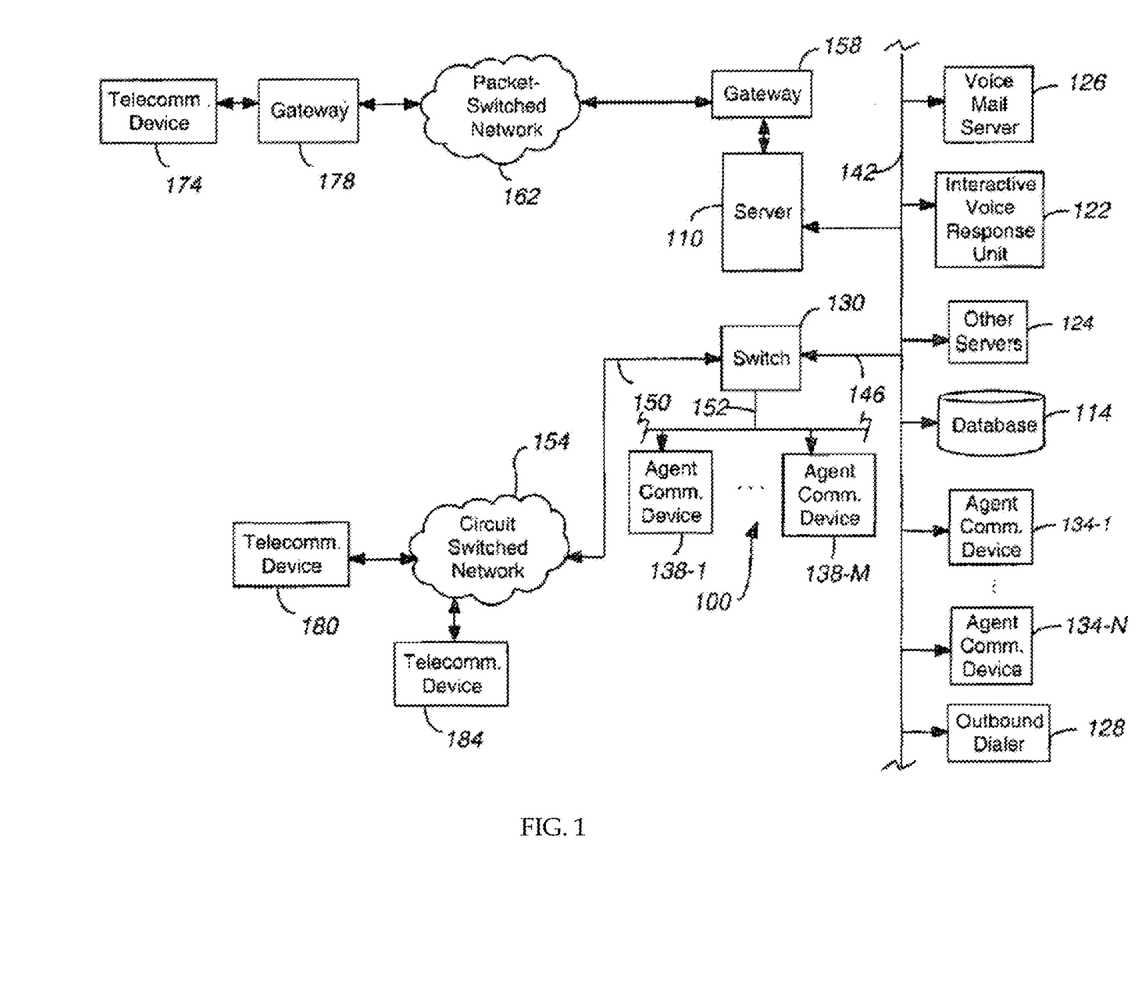
FIG. 1 illustrates an a contact center in accordance with an embodiment of the present invention.

FIG. 1 depicts a contact center in accordance with an embodiment of the present invention. A contact center 100 comprises a central server 110, a set of data stores or databases 114, which may or may not be contained within the central server 110, the databases 114 containing customer related information, historical customer information and other information that can enhance the value and efficiency of the customer, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers or handheld communication devices including wireless communication devices), and/or circuit-switched (second) telecommunication devices 138-1 to M, all interconnected by a local area network LAN (or wide area network WAN) 142. The servers can be connected via optional communication lines 146 to the switch 130.

As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected, via a plurality of trunks 150, to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, and the like.

The server and/or switch can be a software-controlled system, including, but not limited to, a processing unit (CPU), microprocessor, or other type of digital data processor executing software or an Application-Specific Integrated Circuit (ASIC) as well as various portions or combinations of such elements.

Typically, the switch/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

The gateway 158 can be Avaya Inc.'s, G700 Media Gateway™, and may be implemented as hardware, such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts to, and receive outgoing contacts, from these extensions in a conventional manner. The second telecommunication devices can include, for example, wired and wireless telephones, PDAs, H.320 video phones and conferencing units, voice messaging and response units, and traditional computer telephony adjuncts.

It should be noted embodiments of the present invention do not require any particular type of information transport medium between switch or server and first and second telecommunication devices. That is, embodiments of the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk. It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the customer associated with the contact to the contact center 308 as described in FIG. 3. The contact center 308 may determine how to route the contact. Based on the routing decisions of the contact center 308, the customer associated with the contact can be routed to the IVR unit 122, the voice mail server 126, and/or first or second telecommunication devices 134, 138 associated with a selected preferred agent.

Figure 2:
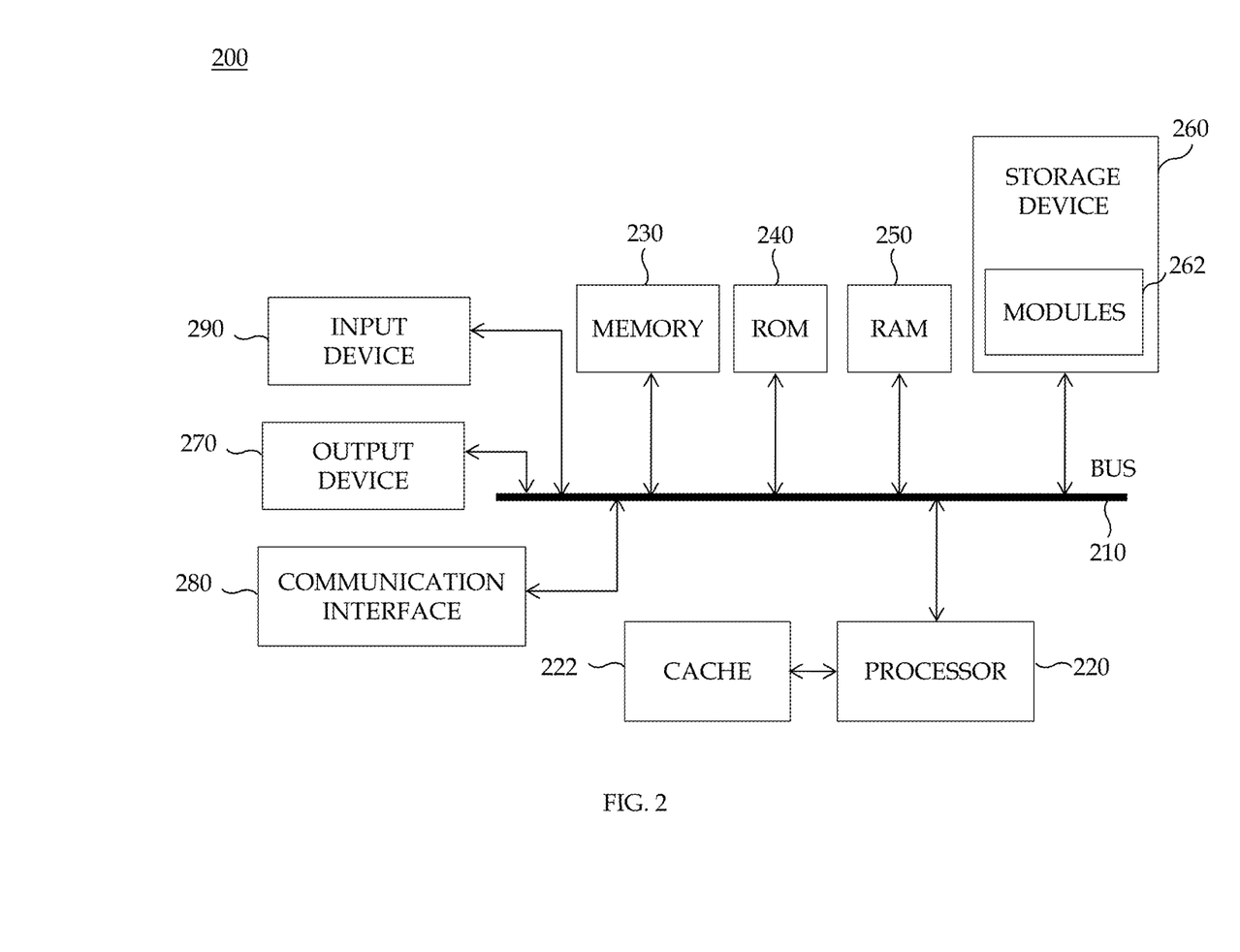
FIG. 2 illustrates an example system of a customer device for interfacing with the contact center of FIG. 1.

With reference to FIG. 2, an exemplary system includes a general-purpose computing device 200, including a system bus 210 and a processing unit (CPU or processor) 220 that couples various system components including the system memory 230 such as read only memory (ROM) 240 and random access memory (RAM) 250 to the processor 220. The system may include a cache 222 of high speed memory connected directly with, in close proximity to, or integrated as part of the processor 220. The system copies data from the memory 230 and/or the storage device 260 to the cache 222 for quick access by the processor 220. In this way, the cache 222 provides a performance boost that avoids the processor 220 delays while waiting for data. These and other modules may control or be configured to control the processor 220 to perform various actions. Other system memory 230 may be available for use as well. The memory 230 may include multiple different types of memory with different performance characteristics. It may be appreciated that the disclosure may operate on a computing device 200 with more than one processor 220 or on a group or cluster of computing devices networked together to provide greater processing capability. The processor 220 may include any general purpose processor and a hardware module or software module 262 stored in storage device 260, configured to control the processor 220 as well as a special-purpose processor where software instructions are incorporated into the actual processor design. The processor 220 may essentially be a completely self-contained computing system, containing multiple cores or processors, a bus, memory controller, cache, etc. A multi-core processor may be symmetric or asymmetric.

The system bus 210 may be any of several types of bus structures including a memory bus or memory controller, a peripheral bus, and a local bus using any of a variety of bus architectures. A basic input/output (BIOS) stored in read only memory (ROM) 240 or the like, may provide the basic routine that helps to transfer information between elements within the computing device 200, such as during start-up. The computing device 200 further includes storage device 260 such as a hard disk drive, a magnetic disk drive, an optical disk drive, tape drive or the like. The storage device 260 may include software module 262 for controlling the processor 220. Other hardware or software modules are contemplated. The storage device 260 is connected to the system bus 210 by a drive interface. The drives and the associated computer readable storage media provide non-volatile storage of computer readable instructions, data structures, program modules and other data for the computing device 200.

In one embodiment of the present invention, a hardware module that performs a particular function includes the software component stored in a computer-readable medium in connection with the necessary hardware components, such as the processor 220, bus 210, output device 270, and so forth, to carry out the function. The basic components are known to those of skill in the art and appropriate variations are contemplated depending on the type of device, such as whether the computing device 200 is a small, handheld computing device, i.e., a smart phone, a desktop computer, or a computer server.

Although the exemplary embodiment described herein employs the hard disk 260, it should be appreciated by those skilled in the art that other types of computer readable media which may store data that are accessible by a computer, such as magnetic cassettes, flash memory cards, digital versatile disks, cartridges, read only memory (ROM) 240, random access memories (RAMs) 250, a cable or wireless signal containing a bit stream and the like, may also be used in the exemplary operating environment. Non-transitory computer-readable storage media expressly exclude media such as energy, carrier signals, electromagnetic waves, and signals, per se.

To enable customer interaction with the computing device 200, an input device 290 represents any number of input mechanisms, such as a microphone for speech, a touch-sensitive screen for gesture or graphical input, keyboard, mouse, motion input, speech and so forth. An output device 270 may also be one or more of a number of output mechanisms known to those of skill in the art. In some instances, multimodal systems enable a customer to provide multiple types of input to communicate with the computing device 200. Communication interface 280 generally governs and manages the customer input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 220. The functions these blocks represent may be provided through the use of either shared or dedicated hardware, including, but not limited to, hardware capable of executing software and hardware, such as a processor 220, that is purpose-built to operate as an equivalent to software executing on a general purpose processor. For example the functions of one or more processors presented in FIG. 2 may be provided by a single shared processor or multiple processors. Further, use of the term "processor" should not be construed to refer exclusively to hardware capable of executing software. Illustrative embodiments may include microprocessor and/or digital signal processor (DSP) hardware, read-only memory (ROM) 240 for storing software performing the operations discussed below, and random access memory (RAM) 250 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system shown in FIG. 2 may practice all or part of the recited methods, may be a part of the recited systems, and/or may operate according to instructions in the recited non-transitory computer-readable storage media. Such logical operations may be implemented as modules configured to control the processor 220 to perform particular functions according to the programming of the module.

For example, FIG. 2 illustrates the software module 262 in the storage device 260 configured to control the processor 220. These modules may be stored on the storage device 260 and loaded into random access memory (RAM) 250 or memory 230 at runtime or may be stored as would be known in the art in other computer-readable memory locations.

Figure 3:
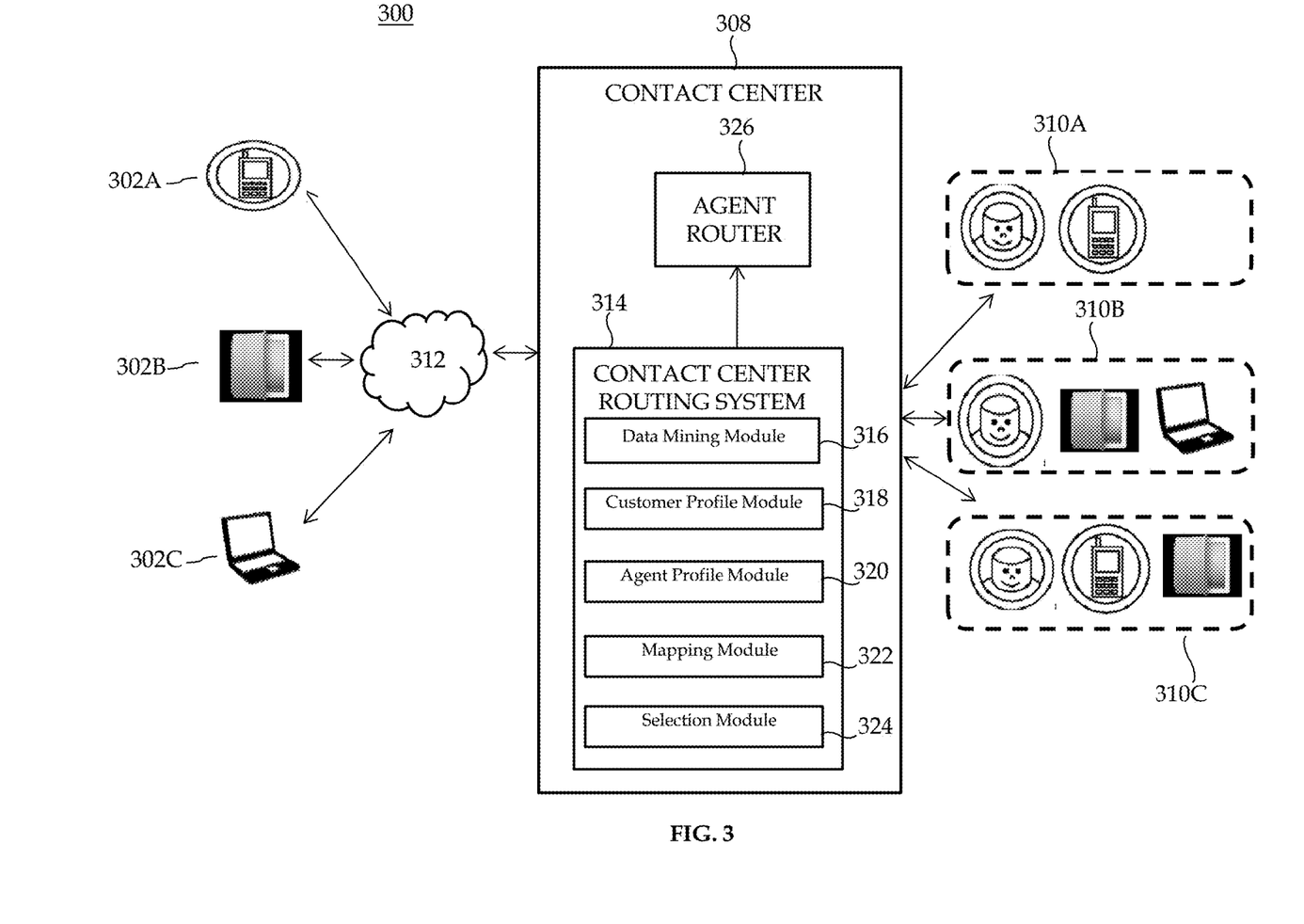
FIG. 3 illustrates an exemplary architecture in accordance with an embodiment of the present invention.

Having disclosed some components of a computing system, the disclosure now turns to FIG. 3, which illustrates a network environment 300 in which the various embodiments of the present invention may be implemented. As shown in FIG. 3, the network environment 300 includes customer and associated customer devices 302A-C, a network 312, a contact center 308, and agent terminals 310A-C.

The network environment 300 includes customer devices 302A-C with their associated customers connected to a contact center 308 via network 312. According to an embodiment of the present invention, the customer devices 302A-C may include, but is not limited to, a computing device 200 of the customer such as, for example, a smart phone, a laptop, a desktop, a tablet, etc. In alternate embodiment, the computing device 200 may include a landline phone. The network 312 may include multiple types of communication channels for a variety of communication media used by the customer devices 302A-C. A communication channel may include, but is not restricted to, a communication network such as the Internet, PSTN, Local Area Network (LAN), Wide Area Network (WAN), Metropolitan Area Network (MAN), and so forth. The communication network may be SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

In the various embodiments of the present invention, the contact center 308 may be configured to have agents support a variety of media capabilities. As discussed above, the term media capability includes the type of media communication and the channel necessary to support the type of media communication between a customer and an agent. For example, an agent in the contact center 308 may support a voice capability by having access to one or more channels that support the bandwidth of a telephonic conversation with the customer.

The switching of media capabilities includes switching from a first media capability with a first communication channel to a second media capability with a second communication channel. Similarly, the contact center 308 may have agents that support media capabilities including instant messaging, Internet relay chat (IRC) or other chatting modes, video-conference, teleconference, or tele-presence, to name a few. The contact center 308 may support messages between the customers and the agents that are stored at some intermediate point. For example, such communication modes may include email, electronic message boards, social networks, or any other communication mode in which messages from the agent to the customer or the customer to the agent are stored at some intermediate point, allowing the recipient to access the messages without the need to maintain an active communication link with the sender. However, the various embodiments are not limited in this regard and any other types of media capabilities may also be used.

The contact center 308 may be configured to support the communication modes described above using a wide variety of devices for the customer devices 302A-C, including devices operating over analog or digital communication channels designed for the delivery of information to and from customers in an audio form, a visual form (including static and dynamic visual elements), or any combination thereof. For example, in some embodiments of the present invention, the contact center 308 may be configured to support the customer devices 302A-C consisting of a general purpose computer device 200 connected to the data network 312, as described above with respect to FIG. 2.

Such devices may include, but are not limited to, a desktop computer, portable computer, lap-top computer, personal digital assistant, smart phone, tablet or any other type of appliance or device having access to one or more data networks over such networks. However, the various embodiments are not limited in this regard. For example, the customer devices 302A-C may be devices communicating over telephony networks or any other type of communication networks. Such devices may include land-line telephone devices, mobile or cellular telephone devices, videophone devices, and the like. However, the various embodiments are not limited in this regard and any other types of devices may be used for customer devices 302A-C.

The customer devices 302A-C and the contact center 308 may communicate in various ways using a variety of media capabilities. In one embodiment of the present invention, a customer makes use of a customer device 302A to establish a communication session with the contact center 308. For example, the customer may establish a telephony communication channel with the contact center 308. The customer may then want to switch to a video enabled communication channel. By having the contact center 308 initially interrogate the customer device 302A to determine which media capabilities customer device 302A is capable of using, the contact center can determine an agent 310A-C who matches the media capabilities of the customer device.

As shown in FIG. 3, a first customer with customer device 302A may use a mobile device to communicate with an agent 310A-C through the contact center 308. The contact center 308 may interrogate the customer device 302B to determine the various media capabilities of the mobile device 302A. The contact center 308 may interrogate the customer device 302A to determine the various media capabilities of the mobile device 302A. For example, the mobile device 302A may have media capabilities of email and voice. The email and voice capabilities will be used by the contact center 308 to route customer device 302A to an agent who best matches these capabilities.

A second customer with customer device 302B may use a tablet to communicate with an agent 310A-C through the contact center 308. The contact center 308 may interrogate the customer device 302B to determine the various media capabilities of the tablet. For example, the tablet may have the media capabilities of email, web chat and voice. The email, web chat and voice capabilities will be used by the contact center 308 to route customer device 302B to an agent who best matches these capabilities.

A third customer with customer device 302C may use a laptop computer to communicate with an agent 310A-C through the contact center 308. The contact center 308 may interrogate the customer device 302C to determine the various media capabilities of the laptop. For example, the customer device 302B may be a laptop which has the media capabilities of email, web chat, voice and video to communicate with an agent 310A-C through the contact center 308. The email, web chat, voice and video capabilities will be used by the contact center 308 to route customer device 302C to an agent who best matches these capabilities.

The network environment 300 may include agent terminals 310A-C associated with agents of the contact center 308 and configured for providing services to the customers located at the customer devices 302A-C. In particular, the contact center 308 connects and manages the one or more communication channels between the customer device 302A-C and the agent terminal 310A-C. Although the agent terminals 310A-C are shown in FIG. 3 as being connected to the network 312 via the contact center 308, the various embodiments are not limited in this regard. Rather, in some embodiments of the present invention, one or more of the agent terminals 310A-C may be directly connected to the network 312 and may communicate with the contact center 308 via network 312. The description above regarding the communication modes and devices for the customer device 302A-C is equally applicable to the agent terminals 310A-C.

Further, according to an embodiment of the present invention, the contact center 308 includes a contact center routing system 314, and a rules database (not shown). The contact center routing system 314 includes a data mining module 316, a customer profile module 318, an agent profile module 320, a mapping module 322, and a selection module 324.

The data mining module 316 is configured to mine the customer devices 302A-C. In an embodiment of the present invention, the data mining module 316 is configured to mine a customer device 302A-C in order to determine the media capabilities on the device 302A-C. For example, the data mining module 316 may interrogate a customer device 302 to determine that the customer device includes, but is not limited to, email, web chat, voice and video capabilities. In one embodiment, the customer device may transmit, as part of negotiating the connection with the contact center 308, the media capabilities the customer device is capable of using. According to another embodiment of the present invention, the data mining module 316 is configured to interrogate the customer device 302A-C to determine the version, the browser, and various applications which reside on the customer device and the associated media capabilities. For example, the customer device 302A-C may include a browser and therefore the data mining module 316 may determine that the customer device 302A-C includes a web chat capability. In another example, the customer device may include a Skype™ application. The data mining module 316 may mine the Skype™ application to determine that the customer device includes voice and text capabilities.

According to another embodiment of the present invention, the data mining module 316 may be configured to operate with other modules, internal or external to the contact center 308, for collecting data regarding the customer device 302A-C. For example, the data mining module 316 may be configured to operate with a third party aggregator system (not shown) connected to the network 312.

The customer profile module 318 is configured to build a profile of a customer who is communicating through a customer device 302A-C with the contact center 308. The customer profile module 319 is configured to build the customer profile with the mined media capabilities on the customer device. The customer profile module 318 may include additional mined media capabilities when the customer communicates with the contact center 308 through a customer device 302A-C. In an embodiment, each communication with the customer to the contact center generates a work request. The customer profile module 319 may obtain historical data based on prior communication from the customer (i.e., prior work requests). The customer profile module 319 may include the media capabilities which customer previously used when interacting with an agent 310A-C through the contact center 308. The prior media capabilities used in communication between the customer and an agent through the contact center as well as the mined media capabilities of the customer device may be stored as data in the customer profile.

The customer profile module 319 may include data on whether a customer switched, enhanced or de-enhanced media capabilities during communication with an agent through the contact center. The customer profile module 319 may track whether a customer switched media capabilities from a first media capability to a second media capability during a single communication with the contact center. For example, a customer may have begun the communication using a texting capability with the agent through a web chat. However, during the communication with the agent, the customer may have enhanced their media capability to a voice capability. The customer profile may reflect this change in media capabilities used by the customer.

Additionally, the customer profile module 319 may be configured to determine whether the customer 302A-C is a high value customer. A high value customer is a customer who is determined to be important to the contact center's business. A high value customer may have a high financial value to the business assisted by the contact center. Alternatively, a high value customer may be determined based on frequency of communication with the contact center or alternate means. The customer profile module may indicate whether the customer is a high value customer in the customer profile.

The agent profile module 320 is configured to build a profile for the agents in the contact center 308. The agent profile module builds a profile of an agent based upon the media capabilities which are supported by the agent. For example, the agent associated with agent terminal 310A may only have only the capabilities associated with a mobile phone. In some examples, the mobile phone may include only a voice capability. In alternative examples, the mobile phone may have web and voice capabilities. In another example, the agent associated with agent terminal 310B may support the media capabilities on a laptop and/or a tablet. In this embodiment, the agent may have both a laptop and a tablet at his disposal and can communicate with a customer on either device. As the agent has access to the media capabilities on a laptop and/or a tablet, the agent associated with agent terminal 310B may support text, web, voice and video capabilities. Lastly, the agent associated with agent terminal 310C may support text, web, voice and video capabilities associated with a phone and/or a tablet.

The mapping module 322 is configured to map a customer profile to an agent profile. The mapping of the customer profile to an agent profile may be based on one or more predefined rules stored in a rules database. The rules database may be stored with in the contact center 308 or external to the contact center. The rules are based on data about the media capabilities from the customer profile and data about the media capabilities from the agent profile.

According to an embodiment of the present invention, the mapping module 322 is configured to specify what constitutes a good match between a customer profile and an agent profile. According to another embodiment of the present invention, the mapping module 322 is configured to compute a matching score between the customer profile and agent profiles who are available or may be available shortly in the contact center 308. The matching score may be based on how many rules may be applied to a given customer-agent combination. The customer-agent combination may obtain scores based on rules associated with mapping the media capabilities in customer profile with the media capabilities in the agent profile. In an embodiment, if all or nearly all of the media capabilities in the customer profile match with the media capabilities in the agent profile, then the customer-agent combination may obtain the highest matching score.

According to one embodiment, the importance of mapping of a specific media capability in the customer profile to the agent profile may be reflected in a matching score. The mapping module 322 may determine a customer's preference for certain media capabilities by analyzing data from the customer profile. The mapping module 322 may use rules to analyze the customer profiles and determine the probability that a specific media capability will be used by a customer. Based on the probability, the mapping module may determine the importance of matching a customer with an agent that supports that media capability. In an embodiment, the importance of a media capability may be an aspect of the matching score generated between a customer and an agent.

In an embodiment, the mapping module 322 may analyze the media capabilities in the customer profile to determine whether a customer is likely to switch from a first media capability to a second media capability during a single communication or work request with the contact center 308. For example, the customer profile may include a customer history that during five of the last seven communications with an agent the customer switched from a voice capability to a video capability. After analyzing the customer history, the mapping module 322 may determine that even though the customer contacted the contact center 308 using a voice capability, the customer has a strong preference for video and is very likely to switch to a video capability.

As a result, the mapping module 322 may use one or more rules to indicate the customer should be matched to an agent that supports a video capability. The rules may be used so that a customer with a history of switching obtains a high matching score if the agent the customer is mapped with supports both capabilities. Similarly, a matching score for a customer that merely has a device with both capabilities but no history of switching from media capability to another media capability may obtain a high mapping score if just the media capabilities being used at the time of communication are matched.

In an alternate example, the mapping module 322 may determine that a media capability such as a voice capability that is on the current customer device has never or infrequently been used by the customer. As such, the mapping module 322 may use rules to create a matching score that indicates a low priority in mapping an agent that supports the unused media capability.

In some embodiments of the present invention, mapping module 322 may use a vector matching technique in order to find a preferred agent. Individual media capabilities used to help match a customer with an agent may be represented as individual elements of a multi-dimensional vector. Media capabilities associated with the customer, either on the customer device or from the customer's history, may be mapped to a customer vector. Media capabilities of agents in contact center 308 may be mapped to a respective agent vector. Vector matching may then be used to correlate the customer with a plurality of agents, in order to find a preferred matching agent.

The selection module 324 is configured to select an agent based on the mapping between customer and the agent. In an embodiment, selection module 324 selects an agent with the highest score. The agent with the highest score based on the mapping criteria may be selected by a routing process (e.g., agent router 326).

As also shown in the network environment 300, the connection between the customer device 302 and agent terminal 310 is provided via agent routing module in an agent router 326. The agent router 326 establishes a communication channel between the customer device 302 and the agent terminal 310. In an embodiment, the communication channel established may be for the specific media capability initially used by the customer device. When the customer wants to switch to a second media capability, a channel may be established for the second media capability. In an embodiment, the customer and agent could just press a button to switch to the second media capability since the devices of both the agent and the customer support the second media capability. In an alternate embodiment, more than one of the possible communication channels associated with the matched media capabilities may be established when the customer is routed to an agent.

Figure 4:
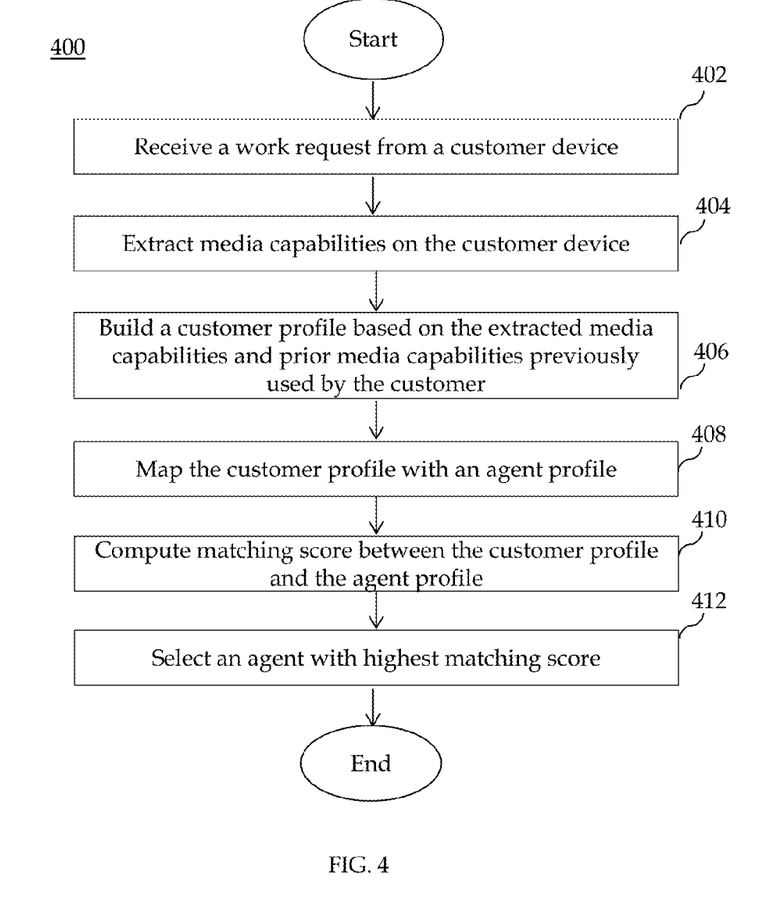
FIG. 4 illustrates a flowchart in accordance with an embodiment of the present invention.

FIG. 4 illustrates a method 400 for matching a customer profile with agent profiles based on a customer's media capabilities for improved contact center routing.

At step 402, a work request is received by a contact center 308 from a customer device 302. In an embodiment of the present invention, a work request is communicated by a customer using a particular media capability. For example, the work request may be communicated over the telephone using a voice capability to communicate with the contact center 308. Alternatively, the work request may be communicated using a text based capability as the customer may send the work request by text message, email, web chat or a submitted Web support form.

At step 404, media capabilities of the customer device are extracted. In an embodiment, the customer device which initiated the work request may be interrogated to determine which media capabilities are on the customer device. In an embodiment, the work request may be processed to determine which media capability which initiated the work request e.g., voice capability, text capability, etc. The data mining module 316 may gather all the media capabilities on the customer device. For example, the customer device may communicate the work request over a mobile device using a voice capability, but the customer device may also include a text capability, a web capability and a video capability.

At step 406, a customer profile based on the extracted media capabilities and prior media capabilities previously used by the customer may be built. The customer profile may include the extracted media capabilities from the customer device. The customer profile may also include the prior media capabilities previously used by the customer in prior work requests between the customer and an agent through the contact center. The prior media capabilities included in the customer profile may include both the initial media capability used to connect the customer with the agent as well as any other media capabilities used during the communication between the customer and the agent. The customer profile may include whether the customer enhanced or switched from a first media capability to a second media capability during a work request. The prior media capabilities used in communication between the customer and an agent through contact center as well as the mined media capabilities of the customer device may be stored as data in the customer profile.

At step 408, the contact center 308 maps the customer profile with an agent profile. The customer profile may be mapped to an agent profile based on predefined rules. The media capabilities associated with the customer profile include both the extracted or mined media capabilities from the customer device and prior media capabilities used by the customer in previous communications or work requests with the contact center. The agent profile may include one or more media capabilities supported by the agent. The set of rules may specify what constitutes a good match between the customer profile and the agent profile. For example, if a customer has a voice capability and a video capability and has previously used both capabilities on the customer device, the contact center 308 may use rules to preference an agent that has voice and video capabilities. However, if the customer device has text, audio and video capabilities but the customer previously has only used the text and audio capabilities on the customer device, the rules may reflect this customer preference and the customer may be mapped to an agent that has only text and voice capabilities.

At step 410, a matching score is computed between the customer profile and agent profile. In an embodiment of the present invention, the contact center routing system 314 may compute a matching score of the customer-agent combination. The contact center 308 matches the media capabilities in the customer profile with the media capabilities of the available agents in the contact center 208. The agents of the contact center 208 may then assign a matching score. In an embodiment, an agent having the highest number of matching media elements between the customer and the agent may be assigned with the highest matching score. In an embodiment, if only some of the media capabilities of the customer are mapped to an agent's media capabilities, the agent may be assigned a lower matching score.

In an embodiment, a matching score may need to exceed a minimum threshold number in order to select the agent for the customer. If the matching score does not exceed the threshold number, then a customer may wait until an agent becomes available who has a matching score that exceeds the threshold number. In an embodiment, the customer profile may indicate that the customer is a high value customer. A high value customer may need to have a matching score exceeding a higher threshold number in order for the customer to be matched with the agent. In such an embodiment, agents with less common media capabilities, such as a video capability, may be reserved to support high value customers. In an embodiment, the agent selected may need to match all of the media capabilities of the high value customer. In an alternate embodiment, the agent selected may need to match all the preference media capabilities of the high value customer.

At step 412, the contact center 208 may select an agent to answer the work request of the customer. In one embodiment of the present invention, the contact center 308 may select the agent based on the assigned matching score. The agent with the highest matching score may be selected to answer the work request.

Figure 5:
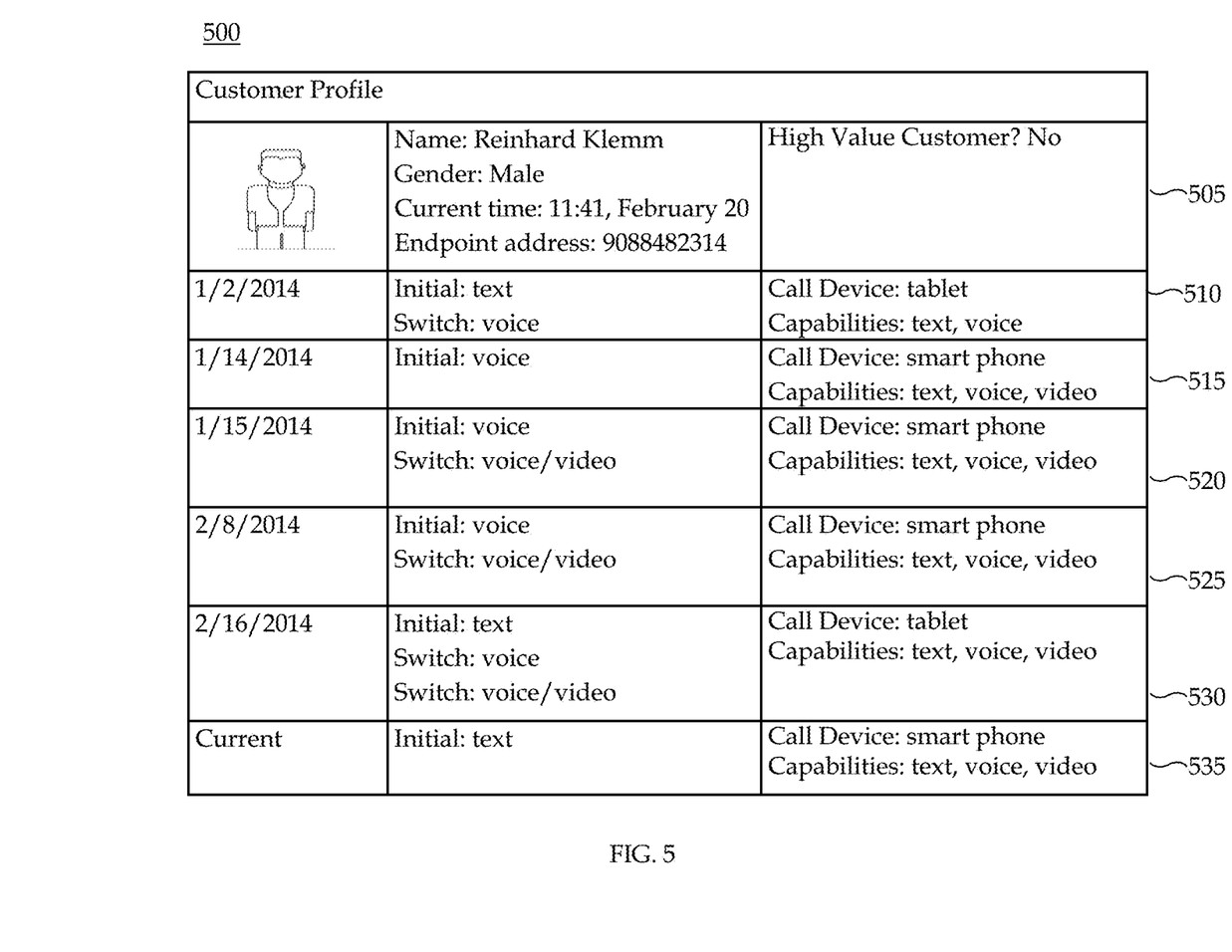
FIG. 5 illustrates an exemplary customer profile in accordance with an embodiment of the present invention.

FIG. 5 illustrates a customer profile. As shown in FIG. 5, the customer profile 500 of a customer may include the background information about the customer 505. For example, the customer background 505 may include, but is not limited to, the customer's name, gender, current time and endpoint address. Additionally, the customer background 505 information may include whether the customer is considered a high value customer. The profile page may include the customer device used, the media capabilities associated with the device and the media capabilities used during the communication between the customer and an agent through the contact center 510-535. For example, the customer profile 500 may include the date and the customer device which was used during the communication to an agent at the contact center during a work request. The customer profile 500 may also include the media capabilities that are on the customer device at the time of the communication. Each time the customer communicates with the contact center, the customer profile is updated with the media capabilities on the customer device as determined by the data mining module 316. The customer profile may include a history of when the customer enhanced, de-enhanced or switched media capabilities during a work request. However, the various embodiments are not limited in this regard and other types of customer data may also be provided without limitation.

Looking to FIG. 5, a first work request 510 was initiated using a text capability on a tablet. The tablet was mined and the data mining module 316 determined that the tablet included the media capabilities of text and voice. However, during the text communication between the customer and the agent, the media capability was enhanced to voice. At the second work request 515, the customer began with a voice capability on a smart phone and remained using the same media capability throughout the communication. At a third work request 520 and a fourth work request 525, the customer began with a voice capability on a smart phone and enhanced the media capability to video during the work request. In another embodiment of the present invention, the customer may also enhance the media capability to a video with voice capability during the work request. At a fifth work request 530, the customer began with a text capability on the tablet and enhanced the media capability to a voice capability and then further enhanced the voice capability to a video with voice capability. On the current request 535, the customer is communicating with the contact center on a smart phone that has text, video and voice capabilities. The customer is communicating the work request to the contact center using a text capability. Further, the customer may also use two or more media capabilities simultaneously. For example, in the current request 535, the customer may add a media capability (e.g., video capability) while communicating with the contact center.

The customer's history can be used in determining whether the customer is likely to switch media capabilities during the work request. Looking at the customer in the customer profile 500, the customer enhanced to video three of the last five communications with the contact center 308. As a result, the contact center routing system 315 may determine that there is a high likelihood that the customer will want to switch from an initial text or voice capability to a video or video with voice capability during the work request. As such, the mapping module may create rules which indicate this customer preference. The mapping system may allocate an agent with the voice and video capability even if the customer initially uses only a text capability due to the history of the customer enhancing the media capability to voice and video.

The exemplary systems and methods of this present invention have been described in relation to a customer device (e.g. smart device). However, to avoid unnecessarily obscuring embodiments of the present invention, the preceding description omits a number of known structures and devices. This omission is not to be construed as a limitation of the scope of the claimed invention. Specific details are set forth to provide an understanding of embodiments of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more customers' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for embodiments of the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of embodiments of the present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although embodiments of the present invention describe components and functions implemented in the embodiments with reference to particular standards and protocols, embodiments of the present invention is not limited to such standards and protocols. Other similar standards and protocols not mentioned herein are in existence and are considered to be included in embodiments of the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in embodiments of the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use embodiments of the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of embodiments of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for routing customer devices to agent terminals in a contact center, comprising:
   a memory storing executable instructions;
   a processor in communication with the memory, wherein the processor when executing the executable instructions:
      mines a plurality of media capabilities on a device of a customer;
      builds a customer profile based on the plurality of mined media capabilities on the device;
      maps the customer profile with a profile of an agent of the contact center, wherein there is a respective agent profile corresponding to each of the agent terminals, the respective agent profile comprising a plurality of media capabilities of the corresponding agent terminal; and
      selects an agent terminal for connection with the customer device based on the mapping of the customer profile with the agent profile, wherein the plurality of media capabilities of the selected agent terminal correspond to the plurality of mined media capabilities of the customer device.

2. The system of claim 1, wherein the processor when executing the executable instructions:
   builds each of the agent profiles based on the plurality of media capabilities supported by the corresponding agent terminal.

3. The system of claim 1, wherein the customer profile further comprises one or more prior media capabilities, wherein the one or more prior media capabilities comprise one or more media capabilities used by the customer in a prior communication with the contact center.

4. The system of claim 1, wherein mining the plurality of media capabilities on the device of the customer comprises mining one or more media capabilities associated with an application on the device.

5. The system of claim 1, wherein the plurality of mined media capabilities of the customer device comprise a first media capability with a first communication channel and a second media capability with a second communication channel.

6. The system of claim 1, wherein the processor when executing the executable instructions:
   indicates whether the customer is a high value customer in the customer profile.

7. The system of claim 1, wherein the processor when executing the executable instructions:
   tracks whether the customer switched media capabilities from a first media capability to a second media capability during a single communication with the contact center.

8. The system of claim 1, wherein the plurality of mined media capabilities of the customer device comprise one or more of electronic mail, text messages, instant messages, voice communication, or video communication.

9. The system of claim 1, wherein mapping the customer profile with the agent profile comprises mapping one or more of the plurality of mined media capabilities from the customer profile to one or more of the plurality of media capabilities from the respective agent profile based on mapping rules stored in a rules database.

10. The system of claim 1, wherein the processor when executing the executable instructions:
    computes a matching score based on the mapping between the customer profile and the agent profile.

11. The system of claim 10, wherein the processor when executing the executable instructions:
    determines whether the matching score exceeds a threshold number for the agent profile mapped to the customer profile.

12. The system of claim 1, wherein the processor when executing the executable instructions:
    for each agent profile, computes a respective matching score between the customer profile and that agent profile; and
    wherein the selected agent terminal corresponds to the agent profile with a highest matching score.

13. A computer-implemented method for routing customer devices in a contact center based on media capabilities, the computer-implemented method comprising:
    extracting, by a processor of the contact center, a plurality of media capabilities from a device of a customer;
    building, by the processor of the contact center, a customer profile based on the plurality of extracted media capabilities;
    mapping, by the processor of the contact center, the customer profile with a profile of an agent of the contact center, wherein there is a respective agent profile corresponding to each of a plurality of agent terminals of the contact center, the respective agent profile comprising a plurality of media capabilities of the corresponding agent terminal; and
    selecting, by the processor of the contact center, an agent terminal for connection with the customer device based on the mapping between the customer profile and the agent profile, wherein the plurality of media capabilities of the selected agent terminal correspond to the plurality of extracted media capabilities of the customer device.

14. The computer-implemented method of claim 13, wherein extracting the plurality of media capabilities from the device of the customer comprises extracting one or more media capabilities associated with an application on the device.

15. The computer-implemented method of claim 13, further comprising:

receiving, by the processor of the contact center, a work request through a particular one of the plurality of media capabilities on the device.

16. The computer-implemented method of claim 13, wherein mapping the customer profile with the agent profile comprises mapping one or more of the plurality of extracted media capabilities from the customer profile to one or more of the plurality of media capabilities from the respective agent profile.

17. The computer-implemented method of claim 13, wherein building a customer profile comprises tracking whether the customer switched media capabilities from a first media capability to a second media capability during a single communication with the contact center.

18. The computer-implemented method of claim 13, wherein the plurality of extracted media capabilities of the customer device comprise one or more of electronic mail, text messages, instant messages, voice communication, or video communication.

19. The computer-implemented method of claim 13, wherein selecting an agent comprises:

computing for each agent profile a respective matching score between the customer profile and that agent profile;

wherein the selected agent terminal corresponds to the agent profile with a highest matching score.

20. The computer-implemented method of claim 13, wherein the customer profile further comprises one or more prior media capabilities, wherein the one or more prior media capabilities comprise one or more media capabilities used by the customer in a prior communication with the contact center.

\* \* \* \* \*